US012582130B2

(12) United States Patent
Andersen et al.

(10) Patent No.: US 12,582,130 B2
(45) Date of Patent: Mar. 24, 2026

(54) APPARATUS AND METHOD FOR CUTTING OPEN A SLAUGHTERED POULTRY BODY WHICH IS SUSPENDED BY THE LEGS AND HAS ALREADY BEEN CUT FREE IN THE REGION OF THE CLOACA TO FORM A VENT OPENING

(71) Applicant: BAADER Food Systems Denmark A/S, Trige (DK)

(72) Inventors: Torben Andersen, Trige (DK); Bendt Soerensen, Trige (DK)

(73) Assignee: BAADER Food Systems Denmark A/S, Trige (DK)

( * ) Notice: Subject to any disclaimer, the term of this patent is extended or adjusted under 35 U.S.C. 154(b) by 37 days.

(21) Appl. No.: 18/843,545

(22) PCT Filed: Mar. 29, 2022

(86) PCT No.: PCT/EP2022/058269

§ 371 (c)(1),
(2) Date: Sep. 3, 2024

(87) PCT Pub. No.: WO2023/186270

PCT Pub. Date: Oct. 5, 2023

(65) Prior Publication Data

US 2025/0194614 A1 Jun. 19, 2025

(51) Int. Cl.
*A22C 21/00* (2006.01)
*A22C 21/06* (2006.01)

(52) U.S. Cl.
CPC .......... *A22C 21/06* (2013.01); *A22C 21/0046* (2013.01)

(58) Field of Classification Search
CPC ........................... A22C 21/06; A22C 21/0046
USPC ........................................................ 452/106
See application file for complete search history.

(56) References Cited

U.S. PATENT DOCUMENTS

| | | | |
|---|---|---|---|
| 3,958,302 A | 5/1976 | Meyn | |
| 4,266,322 A | 5/1981 | Van Mil | |
| 5,299,974 A | * 4/1994 | Jahnke | ................... A22C 25/16 452/120 |

(Continued)

FOREIGN PATENT DOCUMENTS

| | | |
|---|---|---|
| CN | 114073268 A | 2/2022 |
| EP | 1413204 A1 | 4/2004 |

(Continued)

*Primary Examiner* — Richard T Price, Jr.
(74) *Attorney, Agent, or Firm* — Dinsmore & Shohl LLP

(57) ABSTRACT

An apparatus for cutting open a slaughtered poultry body suspended by the legs and already cut free in the region of the cloaca to form a vent opening includes a supporting apparatus for holding/positioning the poultry body during cutting, a tensioning device with a tensioning means for tensioning abdominal skin of the poultry body, and a separating device having at least one separating knife for making a longitudinal cut in the tensioned abdominal skin between the vent opening the sternum tip. The tensioning means is in the form of a knife carrier, with the separating knife pivotably mounted on the carrier to form a unit. The knife is movable relative to the carrier from a standby position, with the knife completely covered inside the carrier, into a cutting position, with the knife protruding from the carrier, and back. A corresponding method is disclosed.

30 Claims, 5 Drawing Sheets

(56) References Cited

U.S. PATENT DOCUMENTS

| | | | | |
|---|---|---|---|---|
| 5,735,735 | A * | 4/1998 | Hahn .................... | A22C 25/145 |
| | | | | 452/119 |
| 2002/0155802 | A1 | 10/2002 | Sorenson et al. | |
| 2004/0203331 | A1 * | 10/2004 | Grobeholz ........... | A22C 25/147 |
| | | | | 452/106 |
| 2016/0262409 | A1 | 9/2016 | Peters | |

FOREIGN PATENT DOCUMENTS

| | | | |
|---|---|---|---|
| NL | 1000307 | C2 | 11/1996 |
| NL | 1011563 | C2 | 9/2000 |
| RU | 2078507 | C1 | 5/1997 |
| WO | 9634533 | A1 | 11/1996 |

* cited by examiner

1

APPARATUS AND METHOD FOR CUTTING OPEN A SLAUGHTERED POULTRY BODY WHICH IS SUSPENDED BY THE LEGS AND HAS ALREADY BEEN CUT FREE IN THE REGION OF THE CLOACA TO FORM A VENT OPENING

CROSS-REFERENCE TO RELATED APPLICATIONS

This application is the U.S. National Stage of PCT/EP2022/058269 filed on Mar. 29, 2022, the entire content of which is incorporated herein by reference in its entirety.

FIELD OF THE INVENTION

The invention relates to an apparatus, configured and adapted for cutting open a slaughtered poultry body which is suspended by the legs and has already been cut free in the region of the cloaca to form a vent opening, comprising a supporting apparatus for holding and positioning the poultry body during cutting, a tensioning device having a tensioning means for tensioning abdominal skin of the poultry body, and a separating device having at least one separating knife which is configured and adapted to make a longitudinal cut in the tensioned abdominal skin of the poultry body between the vent opening and a tip of a sternum of the poultry body.

The invention relates further to a method for cutting open a slaughtered poultry body which is suspended by the legs and has already been cut free in the region of the cloaca to form a vent opening, comprising the steps: holding and positioning a poultry body, which has been supplied to an apparatus for cutting open the poultry body, by means of a supporting apparatus, tensioning abdominal skin of the poultry body by means of a tensioning means of a tensioning device by increasing the distance between the abdominal skin and viscera located in an abdominal cavity of the poultry body, and making a longitudinal cut in the tensioned abdominal skin of the poultry body between the vent opening and a tip of a sternum of the poultry body by means of a separating knife of a separating device.

BACKGROUND OF THE INVENTION

Such apparatuses and methods are used in the poultry-processing industry for preparing slaughtered poultry, in particular slaughtered chickens, for removal of the viscera. To that end, the slaughtered poultry bodies are transported, suspended by the legs in shackles, by means of a conveying means. In preparation for the automatic removal of the viscera, that is to say in particular in order to create sufficient space for the insertion of the corresponding tools for automatically removing the viscera, it is first necessary to remove the cloaca of the poultry animal. In other words, the cloaca is to be detached from the abdominal wall (by the so-called "vent-opening-cut"). To that end, the cloaca is cut out, such that the connection of the intestine to the cloaca is cut out of the abdominal wall with the cloaca so that the free end of the intestine hangs with the cloaca out of the poultry body, which is then open, while the other end of the intestine is still attached to the viscera package. By cutting free the cloaca, the vent opening is formed, which permits access to the abdominal cavity. However, this vent opening is not yet sufficiently large that the tools for automatically removing the viscera can be inserted into the abdominal cavity, and for this reason the vent opening must be made larger.

The apparatus according to the preamble serves that purpose. In the case of the apparatuses known from the prior art, for example according to EP 1 413 204 A1, the poultry body to be processed, the legs of which are suspended in shackles as before, is held in the correct position by the supporting apparatus. To that end, the poultry body is oriented and fixed with its back to the apparatus, its head down and its tail up. As a result of the force of gravity of the suspended poultry body, the abdominal skin is loaded in a vertical direction by the viscera located beneath it, with the result that the abdominal skin lies close to the viscera. The tensioning device is configured for insertion into the vent opening. By means of the tensioning device, the abdominal skin can be tensioned from the inside, for example by being lifted upwards in order to create a distance from the viscera. Cutting is then carried out by means of a knife, which penetrates from outside and above through the abdominal skin into the abdominal cavity in order to make the longitudinal cut between the vent opening and the tip of the sternum. This involves the risk that-inter alia because of a lack of distance of the abdominal skin from the viscera and/or different sizes of the poultry bodies to be processed-viscera or parts thereof located beneath the abdominal skin in the abdominal cavity will be damaged by the separating knife which penetrates the abdominal cavity from outside. In other words, the cutting direction of the separating knife in the direction towards the viscera jeopardises the integrity of the viscera. Nicking or cutting into the viscera is the main reason for contamination of the poultry body, which frequently results in the entire poultry body having to be ejected from the processing.

SUMMARY OF THE INVENTION

The object of the present invention is, therefore, to propose an apparatus for cutting open the abdominal skin in order to enlarge the vent opening, which, regardless of the size of the poultry bodies, ensures improved longitudinal cutting of the abdominal skin in a manner which protects the viscera (which include the organs). It is a further object of the invention to propose a corresponding method.

This object is achieved by an apparatus having the features mentioned at the beginning in that the tensioning means is in the form of a knife carrier on which the separating knife is pivotably mounted to form a unit with the knife carrier, wherein the separating knife is configured and adapted to be movable relative to the knife carrier from a standby position, in which the separating knife is arranged in a completely covered manner inside the knife carrier, into a cutting position, in which the separating knife protrudes at least partly from the knife carrier, and back. As a result of the combination of the separating knife with the knife carrier as the tensioning means and the possibility of completely covering the separating knife inside the knife carrier, the unit can safely be inserted into the abdominal cavity, the abdominal skin can safely be tensioned, and the tensioned abdominal skin can then be cut from the inside, that is to say with a cutting direction away from the viscera. "Safely" describes the fact that the sharp edges of the separating knife are covered as a result of the arrangement inside the knife carrier, so that damage to the viscera is safely and reliably ruled out both on insertion and on tensioning. "Completely" describes the fact that at least all the regions/edges etc. of the separating knife that are configured and suitable for separating/cutting are covered by the knife carrier. The knife carrier preferably covers all regions of the separating knife when the separating knife is in the standby position. Because the abdominal skin is cut open from the inside out, the poultry bodies, irrespective of their size, can be cut open without subjecting the viscera to the risk of damage. There is thus provided an apparatus which ensures safe and simple cutting open of the abdomen of the poultry bodies, irrespective of their size.

A preferred further development of the apparatus is characterised in that the unit configured and adapted for tensioning and cutting the abdominal skin is configured and adapted for insertion through the vent opening into an abdominal cavity, and the separating knife is in the standby position on insertion of the unit into the abdominal cavity and on tensioning of the abdominal skin by means of the knife carrier, and the separating knife can be moved into the cutting position when a final tensioning position of the knife carrier is reached. Insertion of the unit and tensioning by means of the unit can thus be carried out without risk and quickly, because the separating knife is functionless, namely completely covered, during those steps. The final tensioning position can vary. For example, it can be reached when the knife carrier, starting from the vent opening, reaches the tip of the sternum and is lifted upwards in order to maximise the distance of the abdominal skin from the viscera. As soon as this end position is reached, the separating knife can be moved out of the knife carrier, whereby the separating knife pierces the abdominal skin and cuts the connection between the vent opening and the tip of the sternum.

The unit, and in particular the separating knife, is particularly preferably configured and adapted to make the longitudinal cut from the inside of the abdominal skin starting from the tip of the sternum to the vent opening. This cut guiding, which is preset by the constructive design, from the inside and starting from the tip of the sternum in the direction towards the vent opening, ensures that poultry bodies of different sizes are cut in the required number precisely and in a manner which protects the product.

The knife carrier is advantageously substantially L-shaped with a longer leg and a shorter leg, wherein there is formed at least in the shorter leg a slot in which the separating knife is positioned. The approximately L-shaped form of the knife carrier on the one hand, in a simple manner, allows the separating knife to be concealed completely in the knife carrier for insertion of the knife carrier with the separating knife into the abdominal cavity and for tensioning of the abdominal skin, on the one hand, and for freeing of the separating knife for cutting open the abdominal skin, on the other hand. The longer leg is oriented substantially vertically in a starting position (position in which the apparatus is waiting for a poultry body to be processed) of the knife carrier. The shorter leg extends substantially horizontally relative to the longer leg in the starting position.

The two legs are particularly preferably oriented relative to one another at an angle β of between 5° and 45° to the vertical. In the starting position, the knife carrier is positioned above the poultry body to be processed, between the legs. For processing, the knife carrier is first lowered. As a result of the angular form of the knife carrier, the knife carrier enters the vent opening with the shorter leg, or the free end thereof, at an angle of from 5° to 45° to the vertical, which ensures both safe and reliable insertion and safe and reliable movement of the knife carrier inside the abdominal cavity, namely in particular starting from the vent opening in the direction towards the tip of the sternum.

In an advantageous further development of the apparatus, the slot extends, starting from the free end of the short leg, in the longitudinal direction into the region of the long leg, wherein the separating knife is rotatably mounted inside the slot in the region of the long leg. An improved lever action of the separating knife can thus be achieved, in order to permit safe cutting of the abdominal skin for separation of the connection between the tip of the sternum and the vent opening when the separating knife is moved from the standby position into the cutting position.

A preferred embodiment of the apparatus is characterised in that the longer leg of the knife carrier is arranged with an end opposite the shorter leg on an adjusting arm, which is mounted on a sliding sleeve. With this configuration, a simple up and down movement of the knife carrier in the vertical direction can be achieved. The knife carrier can optionally also be arranged directly on the sliding sleeve via the longer leg.

The separating knife is advantageously configured to be movable by means of a control roller, which is guided within a control cam, relative to the knife carrier from the standby position, in which the separating knife is located completely inside the slot, into the cutting position, in which the separating knife is situated outside the slot at least with a free tip of the free end of the separating knife, and back. By means of the control roller, in operative connection with the control cam, simple, robust and safe control of the separating knife is ensured. Instead of the control roller, any other control body can also be used. The separating knife can optionally also be actuated by means of a pneumatic drive/pneumatic cylinder or the like.

In a particularly preferred further development of the apparatus, the longer leg is arranged on the adjusting arm in such a manner that it is rotatable about its longitudinal axis. For example, the leg, which is then hollow, is rotatably mounted on a spindle and is rotatable about its longitudinal axis by means of suitable actuating members. An additional degree of freedom of the knife carrier is thus created, by means of which in particular scraping for detaching the connection between the abdominal skin and a layer of fat and/or between a layer of fat and viscera is ensured and improved. A toothed wheel/toothed rack construction can, for example, be used as the actuating member for rotating the knife carrier about the longitudinal axis. Optionally, a control roller with a corresponding control cam can also be provided. The use of a pneumatic drive/pneumatic cylinder, of servo motors, step motors or the like can also be used for the control. The adjusting arm can optionally also be mounted on the sliding sleeve by means of a ball joint or the like, in order to ensure the degrees of freedom for moving the knife carrier to and from inside the abdominal cavity, on the one hand, starting from the vent opening in the direction towards the tip of the sternum and back and/or, on the other hand, sideways inside the abdominal cavity-namely transverse to an imaginary connecting line between the vent opening and the tip of the sternum.

In order effectively to support the damage-free sliding of the knife carrier inside the abdominal cavity, on the one hand, and with the above-described scraping process, a preferred further development of the apparatus is characterised in that the knife carrier, at least in the region of the shorter leg, is flat on an upper side facing the inside of the abdominal skin. The knife carrier is advantageously semi-circular in cross-section on a lower side facing away from the upper side. By means of this form of the knife carrier, in particular in the region of the shorter leg provided for use inside the abdominal cavity, scraping free and/or detaching of the connection between the layer of fat and the abdominal skin and/or between the layer of fat and the viscera and/or between the layer of fat and the organs (as part of the viscera), in particular the gall bladder and/or the stomach, is ensured particularly reliably and in a manner which protects the product.

The knife carrier is advantageously configured and adapted to be movable vertically up and down by means of a first control roller, which is guided within a control cam, in order to enter the vent opening and emerge again from the abdominal cavity, and to be movable by means of a second control roller, which is guided within a control cam, horizontally inside the abdominal cavity between the tensioned abdominal skin and the viscera, starting from the vent opening in the direction towards the tip of the sternum, and back. The first control roller is preferably arranged on a sliding sleeve. The second control roller is preferably arranged on the adjusting arm. Instead of the control rollers, any other control body can also be used. The knife carrier can optionally also be actuated by means of a pneumatic drive/pneumatic cylinder or the like.

A preferred embodiment of the apparatus is characterised in that the knife carrier, which comprises a probe head at a free end of the shorter leg, can be controlled vertically such that the probe head can be positioned either above or beneath the layer of fat located between the abdominal skin and the viscera. The probe head, which is preferably hemispherical on the lower side and flat on the upper side, is configured and adapted on the one hand for scraping along the inside of the abdominal skin and for displacing the layer of fat and/or the viscera and on the other hand for locating the tip of the sternum, in order to be able to precisely make a straight cut starting from the tip of the sternum in the direction towards the vent opening to the end of the separating knife on the side opposite the separating knife tip. Instead of a straight cut, a curved cut is also possible. To that end, the knife carrier and the separating knife have a curved, sickle-shaped form, wherein the slot in the knife carrier also has a corresponding curve in order to be able to hold the curved separating knife. A curved slot can also be formed in a knife carrier which is formed and oriented linearly.

The supporting apparatus is configured and adapted for holding and positioning the poultry body and can have different forms. The supporting apparatus can be of one-part or multi-part form. The supporting apparatus can form one support point or a plurality of support points at the poultry body. Particularly preferred is an embodiment which is characterised in that the supporting apparatus comprises a supporting ring, which is movable at least vertically up and down and can be slipped over the tail region of the poultry body between the legs, and two supporting hooks, which are movable at least vertically up and down and rest from beneath in the region of the hips. The supporting ring is configured and adapted to enclose and rest against the poultry body in an encircling manner in the region of the abdomen and comprises two lateral supporting arms which are connected via a connecting rod, which is shaped like an arrow. The supporting ring, on the one hand, serves for holding and fixing the poultry body in the desired cutting position and on the other hand cooperates with a supporting plate, described hereinbelow, in order to push the tail of the poultry body into its original position in which there is free access to the vent openings. The supporting hooks are configured and adapted for abutment against the thighs of the poultry bodies in the hip region thereof and can be controlled individually or—preferably—jointly, specifically separately from the supporting ring. The supporting ring is movable from an upper position downwards into the supporting position and back. The or each supporting hook is movable from the bottom upwards into the supporting position and back.

The supporting ring, on the one hand, and the or each supporting hook, on the other hand, are each preferably configured and adapted to be movable by means of a control roller, which is guided within a control cam. The supporting ring is preferably arranged on a sliding sleeve. The control roller is in turn arranged on the sliding sleeve. The supporting hooks, which are arranged on a common sliding sleeve on which the corresponding control roller is arranged, have a corresponding configuration. Instead of the control rollers, any other control body can also be used. The supporting ring and the supporting hooks can optionally also be actuated by means of a pneumatic drive/pneumatic cylinder or the like.

A particularly advantageous apparatus is an apparatus which is characterised in that a supporting plate which is configured and adapted to be movable from a standby position into a supporting position and back is arranged in the region of the supporting apparatus. The supporting plate is configured and adapted in particular for cooperation with the supporting ring described above, in order to push the poultry body outwards in the horizontal direction—that is to say away from the apparatus. Because the supporting ring abuts against the poultry body in the upper region of the abdomen thereof and holds the poultry body, the supporting ring forces the tail into a likewise outwardly directed position (which corresponds to the original position of the tail), so that access to the vent opening from above is free.

Expediently, the supporting plate is arranged in the region of the supporting hooks and is movable by means of a control roller, which is guided within a control cam, from the standby position in the direction towards the poultry body to be processed into the supporting position and back. Associated with the supporting plate is an adjusting arm, at the free end of which the control roller is arranged. Instead of the control roller, any other control body can also be used. The supporting plate can optionally also be actuated by means of a pneumatic drive/pneumatic cylinder or the like.

An advantageous embodiment is characterised in that the supporting apparatus and the unit formed of the tensioning device and the separating device are arranged on a substantially vertically oriented slide rod. Two slide rods are particularly preferably provided, at or on which the sliding sleeves are movably arranged.

The supporting apparatus with the unit formed of the tensioning device and the separating device, can be configured and adapted as a single apparatus, for example, permanently installed along the transport path of the poultry bodies. Particularly preferred is an apparatus which is characterised in that at least one supporting apparatus and at least one unit formed of a tensioning device and a separating device is arranged via the respective slide rod(s) on a carousel conveyor which can be driven in rotation about a substantially vertically oriented axis of rotation, wherein stationary control cams for the control rollers are arranged between two carousel plates which are arranged spaced apart from one another and to which the or each slide rod is fastened. The carousel plates are driven in a revolving manner. The slide rods are arranged on the carousel plates fixedly but detachably. As a result of the movement of the carousel plates with the supporting apparatuses and units arranged thereon, the control rollers run in the (stationary) control cams and thereby control the knife carrier, the separating knife, the supporting ring, the supporting hooks and the supporting plate. It is even more advantageous if a plurality of supporting apparatuses are arranged with the corresponding units on the periphery of the carousel conveyor, or more specifically on the carousel plates.

A preferred further development is distinguished in that the entire assembly consisting of the carousel conveyor and each supporting apparatus as well as each unit formed of a tensioning device and a separating device is configured and adapted to be movable vertically up and down. The entire apparatus can thus be adapted quickly and easily to different sizes of poultry bodies.

The object is also achieved by a method having the steps mentioned at the beginning, which is characterised in that the separating knife together with a knife carrier as the tensioning means is inserted jointly as a unit through the existing vent opening into the abdominal cavity, wherein the separating knife, during the insertion movement of the unit into the abdominal cavity, is located inside the knife carrier in a standby position in which it is completely covered by the knife carrier, the abdominal skin is tensioned by means of the unit in that the unit with the completely covered separating knife is moved upwards in order to increase the distance of the abdominal skin from the viscera, and the longitudinal cut is then made from the inside in the tensioned abdominal skin in order to cut open the poultry body between the vent opening and the tip of the sternum in that the separating knife is moved from the standby position into a cutting position, in which the separating knife protrudes at least partly from the knife carrier.

The unit is advantageously first lowered substantially vertically downwards through the vent opening into the abdominal cavity, so that the unit is located beneath the abdominal skin and above the viscera, wherein the unit is then moved substantially horizontally from the vent opening in the direction towards the tip of the sternum until the free end of the unit has reached the tip of the sternum. In other words, the unit, at least with its free end, enters the abdominal cavity from above through the vent opening and is then moved inside the abdominal cavity beneath the abdominal skin in the direction towards the tip of the sternum. The free end of the unit preferably hits the tip of the sternum.

Preferably, upon reaching the tip of the sternum, the separating knife is moved from the standby position into the cutting position, whereby the separating knife pierces the abdominal skin in the region of the tip of the sternum and cuts open the abdominal skin starting from the tip of the sternum in the direction towards the vent opening. To that end, the separating knife pivots about a bearing point in the knife carrier. A straight longitudinal cut is thus made through the abdominal skin. Optionally, however, a curved cut can also be made, for example in order to prevent abdominal fat, which is located between the abdominal skin and the viscera, in particular also in the region of the stomach, from being cut.

The unit, or a free end thereof, can be inserted into the vent opening perpendicularly. The unit preferably enters the vent opening with its free end at an angle β of between 5° to 45° with respect to the vertical.

Particularly preferably, the unit is moved upwards while the abdominal skin is being cut. The tension of the—already pretensioned—abdominal skin can thereby be increased further, which facilitates cutting. Tensioning and cutting particularly advantageously take place in a superimposed movement. However, it is also possible that the abdominal skin is tensioned, then cutting takes place, and only when the abdominal skin has been cut completely between the tip of the sternum and the vent opening is the unit moved upwards again out of the abdominal cavity.

In a particularly preferred method, the unit is additionally moved to and from sideways inside the abdominal cavity, namely transverse to an imaginary connecting line between the vent opening and the tip of the sternum. This means that the unit is lowered at least with its free end through the vent opening into the abdominal cavity, preferably either between the abdominal skin and a layer of fat or between the layer of fat and the viscera, then is moved in the direction towards the tip of the sternum, and the sideways movement to the left and/or right is carried out even before the tip is reached in order to detach the tissue connections of the layer of fat to the abdominal skin and/or to the viscera by means of the scraping, whereby the resistance on removal of the viscera from the abdominal cavity is reduced. By means of the sideways scraping movement it is thus possible to determine and choose, purposively and precisely, that the layer of fat is left on the poultry body in the region of the abdominal skin or on the viscera, in particular on the stomach.

Before the unit is inserted into the vent opening, the poultry body is advantageously pushed by means of a supporting plate in the horizontal direction away from the apparatus and against a supporting ring of the supporting apparatus in order to move the tail of the poultry body out of the region of the vent opening. In other words, the position of the vent opening in relation to the position of the free end of the unit is controlled in that the supporting ring holds the poultry body and a force in the direction towards the supporting ring is applied to the poultry body by means of the supporting plate.

The apparatus as a whole is particularly preferably adjusted in terms of height in order to be able to process poultry bodies of different sizes. This adjustment takes place when the apparatus is set for a changed size of the poultry bodies to be processed. In this case, the adjustment adjusts not only the supporting apparatus and the unit comprising a tensioning device and a separating device, but also a carousel conveyor on which the or each supporting apparatus and the or each unit are arranged. The carousel conveyor also comprises control cams in which control rollers for controlling the individual components are guided. With the described adjustment of the apparatus as a whole, the control cams are thus also at the same time adjusted in respect of the vertical position.

The method is particularly preferably carried out by means of an apparatus as described herein.

Further advantages arising from the individual method steps have already been described in connection with the apparatus, and for this reason, in order to avoid repetition, reference is made to the corresponding passages.

BRIEF DESCRIPTION OF THE DRAWINGS

Further expedient and/or advantageous features and further developments relating to the apparatus and to the corresponding method will become apparent from the dependent claims and the description. Particularly preferred embodiments will be explained in greater detail with reference to the accompanying drawing, in which:

DETAILED DESCRIPTION OF THE INVENTION

Figure 1:
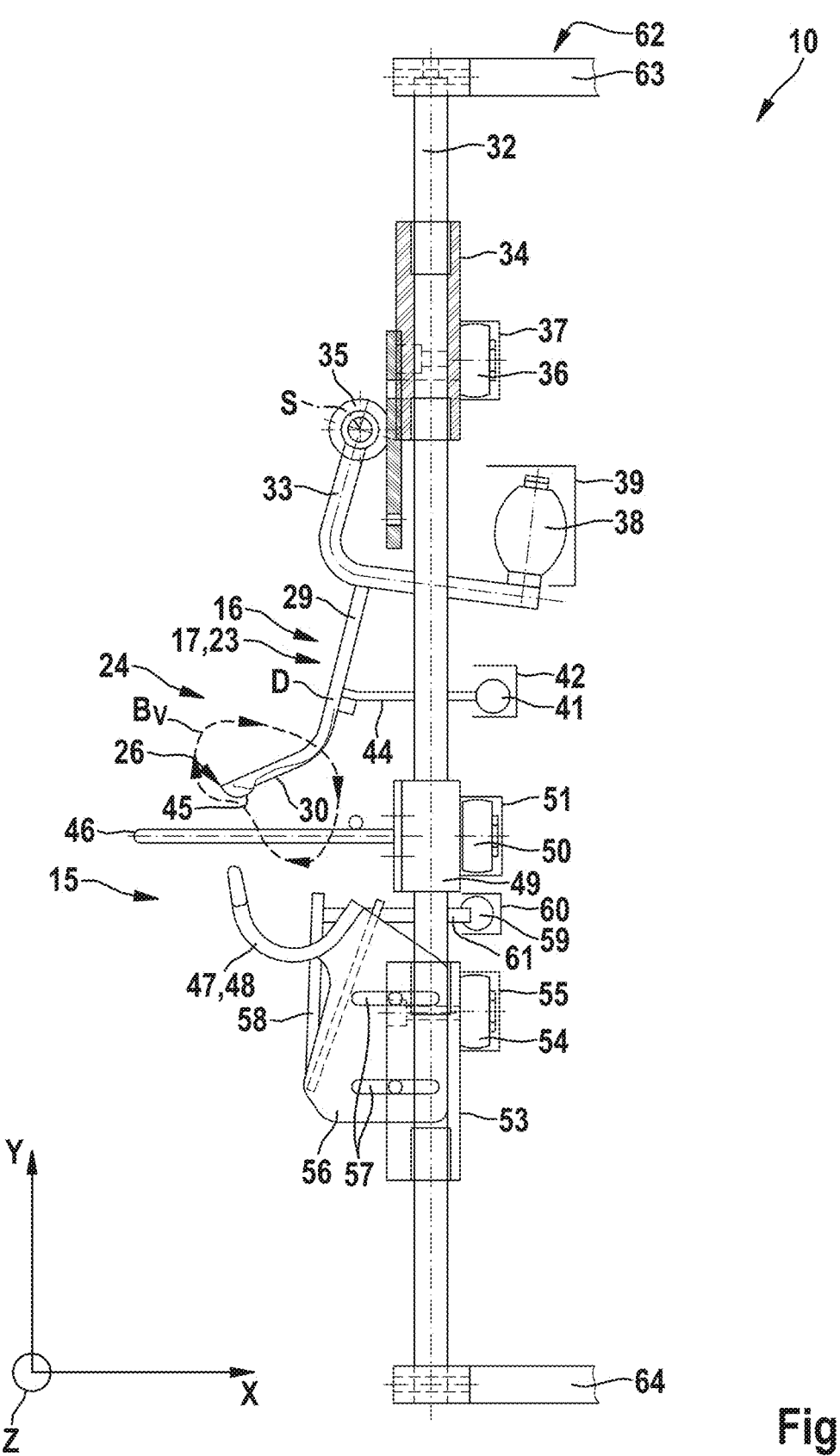
FIG. 1 is a schematic illustration of the apparatus according to the invention with a unit formed of a separating device and a tensioning device in a starting position in which the separating knife is arranged inside the knife carrier, in a side view.

The apparatus according to the invention which is shown serves for cutting open a slaughtered poultry body which is suspended by the legs and has already been cut free in the region of the cloaca to form a vent opening and which is positioned and fixed in the region of the apparatus with its back to the apparatus, its head down and its tail up.

The apparatus 10 shown in the drawing is configured and adapted for cutting open a slaughtered poultry body 14, which is suspended by the legs 11 and has already been cut free in the region of the cloaca 12 to form a vent opening 13, and comprises a supporting apparatus 15 for holding and positioning the poultry body 14 during cutting, a tensioning device 16 having a tensioning means 17 for tensioning abdominal skin 18 of the poultry body 14, and a separating device 19 having at least one separating knife 20 which is configured and adapted to make a longitudinal cut $L_S$, $G_S$ in the tensioned abdominal skin 18 of the poultry body 14 between the vent opening 13 and a tip 21 of the sternum 22 of the poultry body 14. The poultry body 14 is oriented with its back 23 to the apparatus 10. During cutting of the abdominal skin 18, the relative speed between the poultry body 14 to be processed and the apparatus 10, or parts thereof, namely in particular the supporting apparatus 15, the tensioning device 16 and the separating device 19, is preferably zero.

This apparatus 10 is distinguished according to the invention in that the tensioning means 17 is in the form of a knife carrier 23 on which the separating knife 20 is pivotably mounted to form a unit 24 with the knife carrier 23, wherein the separating knife 20 is configured and adapted to be movable relative to the knife carrier 23 from a standby position, in which the separating knife 20 is arranged in a completely covered manner inside the knife carrier 23, into a cutting position, in which the separating knife 20 protrudes at least partly from the knife carrier 23, and back.

The features and further developments described in the following text represent preferred embodiments when considered on their own or in combination with one another. It is expressly pointed out that features which are combined in the claims and/or the description and/or the drawing or which are described in a common embodiment can also further develop the apparatus 10 described above functionally independently.

Instead of one separating knife 20, two or more separating knives 20 can also be provided. The relative movement between the separating knife 20 and the knife carrier 23 can optionally also be produced in a different way, for example by means of a linearly movable knife which can be controlled by means of a pneumatic cylinder or the like. The term "longitudinal cut" describes any cut which extends substantially from the vent opening 13 to the tip of the sternum 22, or vice versa. Straight longitudinal cuts $L_S$ and curved longitudinal cuts $G_S$ are explicitly longitudinal cuts within the meaning of the invention.

Figure 2:
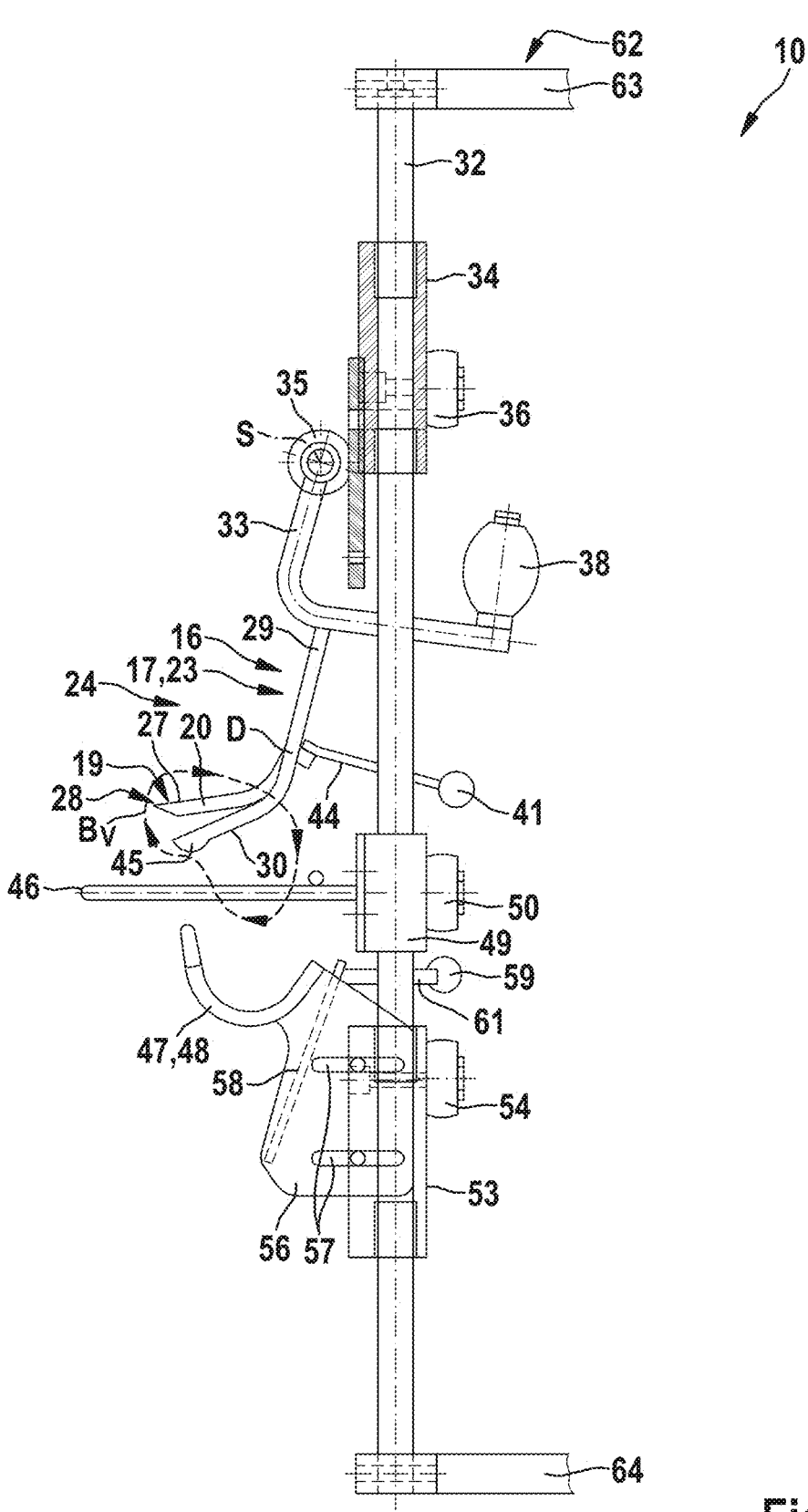
FIG. 2 shows the apparatus according to FIG. 1 with the separating knife in a cutting position.
Figure 3:
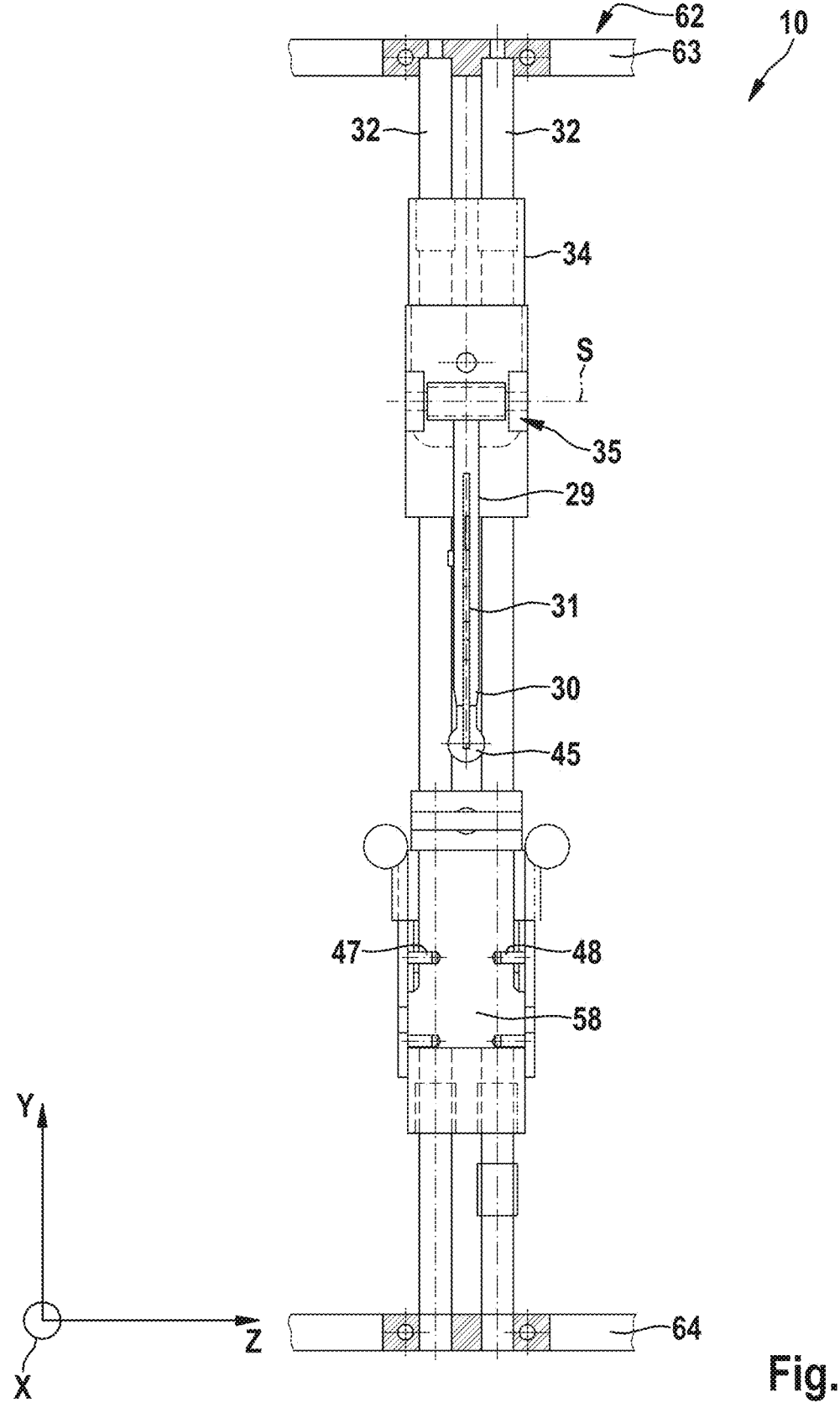
FIG. 3 shows the apparatus according to FIG. 1 in a front view.
Figure 4:
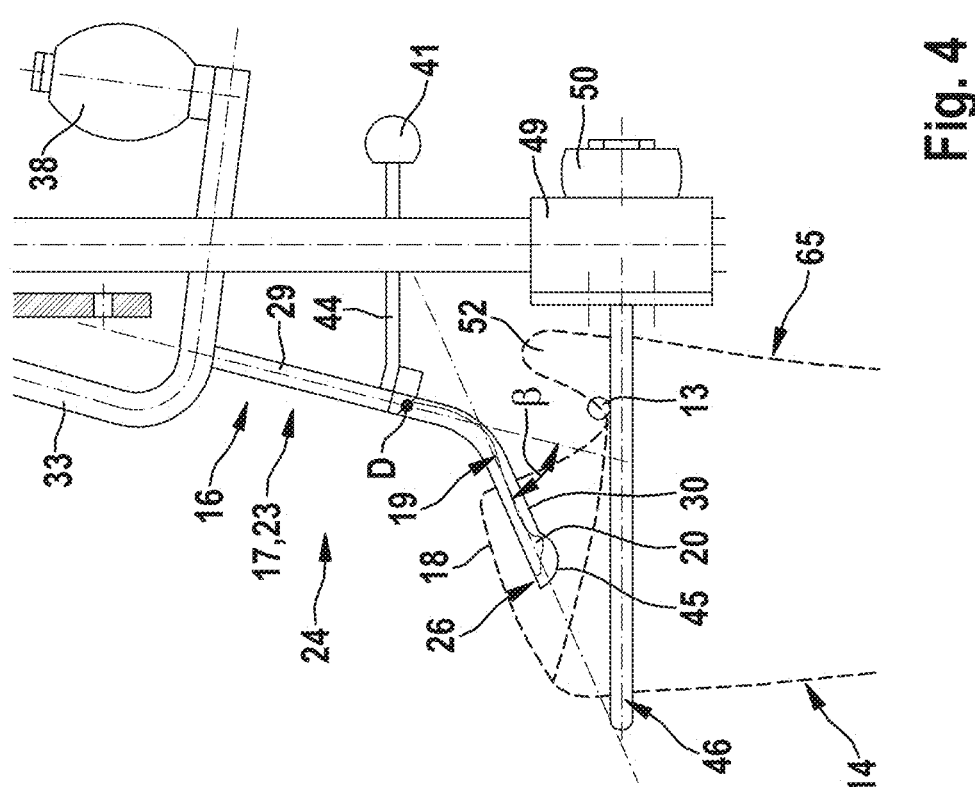
FIG. 4 is an enlarged view of the unit according to FIG. 1.

The unit 24 configured and adapted for tensioning and cutting the abdominal skin 18 is configured and adapted for insertion into an abdominal cavity 25 through the vent opening 13. The unit 24 is a multifunctional unit 24 and, as such, is configured and adapted for tensioning the abdominal skin 18 and cutting it open and optionally also for scraping the inside of the abdominal cavity 25. On insertion of the unit 24 into the abdominal cavity 25 and on tensioning of the abdominal skin 18 by means of the knife carrier 23, or the unit 24, the separating knife 20 is in the standby position. To that end, at least all the regions of the separating knife 20 that are configured and/or suitable for cutting/separation are concealed, that is to say covered, inside the knife carrier 23 (see in particular FIGS. 1 and 4). Only when the knife carrier 23 reaches a final tensioning position can the separating knife 20 be moved into the cutting position (see in particular FIGS. 2 and 5). The final tensioning position can vary. Ideally, it is reached when the unit 24 is situated with a free end 26 in the region of the tip 21 of the sternum 22. In FIG. 1, the broken line indicates the movement profile $B_V$ of the free end 26 of the unit 24. The position shown in FIG. 1 of the unit 24 is an example of the final tensioning position. Alternatively, the final tensioning position can also be reached prior or subsequently thereto. In FIG. 2, it can be seen schematically, by means of the broken line indicating the movement profile BV, that, when the final/optimal tensioning position is reached, the separating knife 20 is configured to be movable relative to the knife carrier 23 out of the latter.

Figure 6:
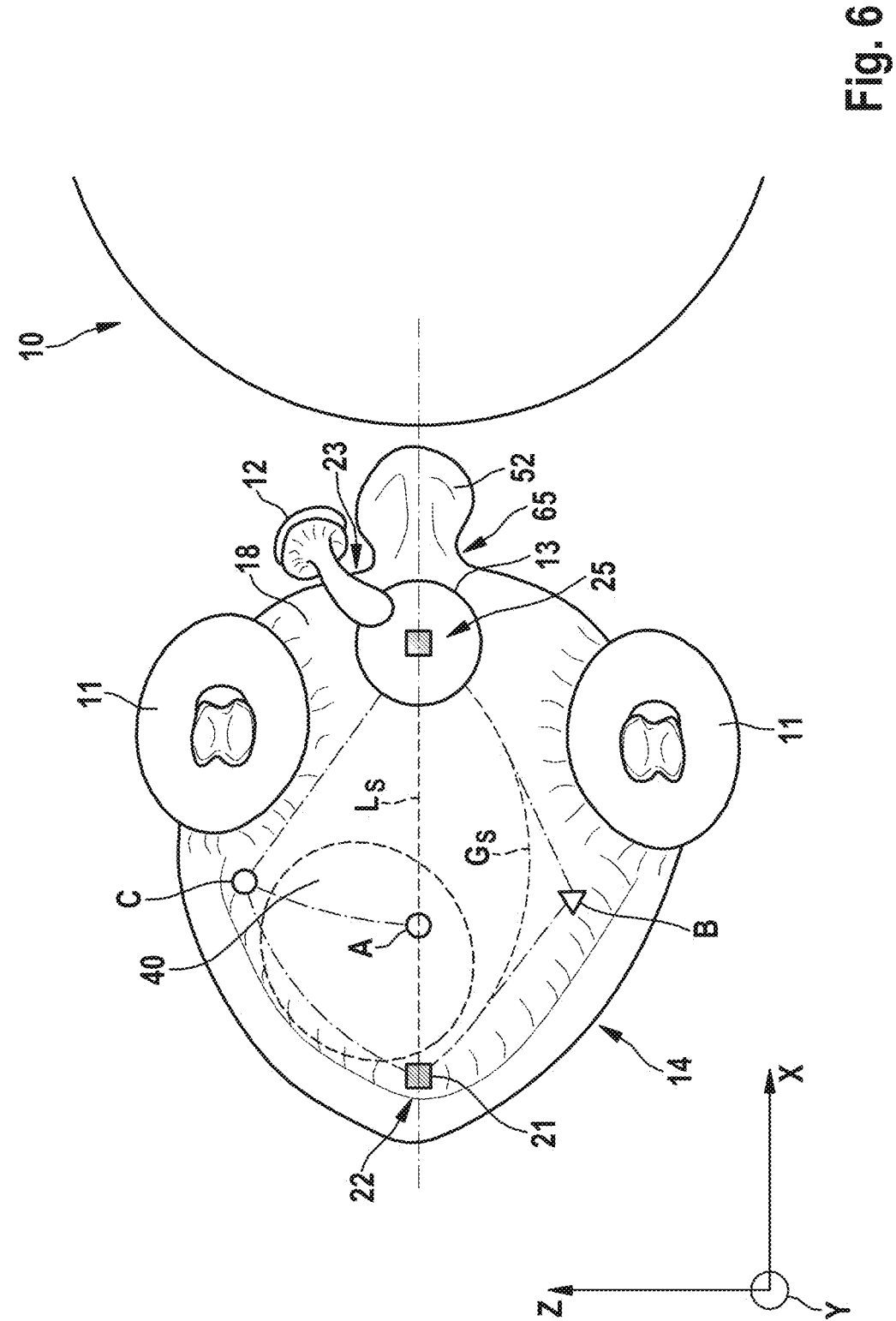
FIG. 6 shows a schematic illustration of a poultry body to be processed, in partial section.

The unit 24, and in particular the separating knife 20, is configured and adapted to carry out the longitudinal cut from the inside of the abdominal skin 18 starting from the tip 21 of the sternum 22 to the vent opening 13. With reference to FIG. 6, it can be seen, schematically, that the unit 14 can be inserted at least with the free end 26 into the vent opening 13 and moved beneath the abdominal skin 18 in the direction towards the tip 21 of the sternum 22. During this movement, the separating knife 20 is protected in a shielded manner inside the knife carrier 23. For cutting, the separating knife 20 has on the side facing away from the knife carrier 23 a sharp cutting edge 27 which preferably extends over a relatively long portion of the free end 26 of the unit 24. The free end 28 of the separating knife 20 is likewise configured with a sharp edge and/or is pointed in order to be able to penetrate the abdominal skin 18 from the inside. The cutting edge 27—while retaining the sharp/pointed end 28 of the separating knife 20—can also be blunt, for example rounded or the like. The cutting edge 27 and the free end 28 of the separating knife 20 are covered inside the knife carrier 23, or shielded by the knife carrier 23, in the standby position.

The knife carrier 23 can have different forms and designs and is preferably substantially L-shaped with a longer leg 29 and a shorter leg 30, wherein there is formed at least in the shorter leg 30 a slot 31 in which the separating knife 20 is positioned. In the preferred exemplary embodiment shown, the slot 31 extends, starting from the free end 26 of the unit 24, or of the shorter leg 30, in the longitudinal direction into the region of the long leg 30. The separating knife 20 is positioned inside the slot 31, wherein the separating knife 20 has a corresponding or adapted L-shape. The separating knife 20 is mounted inside the slot 31 in the region of the long leg 29 so as to be rotatable about an axis of rotation D.

The legs 29, 30 can be connected together in an articulated manner. The legs 29, 30 are preferably rigidly connected together and in one piece form. Ultimately, the shorter leg 30 can be oriented at any desired angle relative to the longer leg 29. A distinct L-shape is likewise possible, such that the angle β to the vertical is 90°. The two legs 29, 30 are preferably oriented relative to one another at an angle β of between 5° and 45° to the vertical. The longer leg 29 is oriented substantially vertically. The shorter leg 30 extends relative thereto particularly preferably at an angle β of 45° to the vertical.

The knife carrier 23 can be arranged directly on a carrier or the like of the apparatus 10 or preferably on a slide rod 32 or a plurality of slide rods 32 of the apparatus 10. The longer leg 29 of the knife carrier 23 is preferably arranged with an end opposite the shorter leg 30 on an adjusting arm 33, which is mounted on a sliding sleeve 34. The sliding sleeve 34 is configured to be movable linearly along the or each slide rod 32. The adjusting arm 33, and thus also the knife carrier 23, is configured to be movable in at least two degrees of freedom, such that the knife carrier 23 is movable together with the separating knife 20 mounted on the knife carrier 23 up and down (in the y-direction) and forwards and backwards (in the x-direction) in a vertical plane (spanned by the x- and y-axes according to FIG. 1). For the vertical adjustability, the adjusting arm 33 is arranged on the sliding sleeve 34. The adjusting arm 33 can be fastened to the sliding sleeve 34 by means of an articulated joint 35, for example, which ensures a pivoting movement about a pivot axis S for the horizontal adjustability.

The knife carrier 23 is movable vertically up and down by means of a first control roller 36, which is guided within a control cam 37, for entering the vent opening 13 and emerging again from the abdominal cavity 25. To that end, the control roller 36 is arranged on the sliding sleeve 34. As a result of the profile of the control cam 37 and the guiding of the control roller 36 in the control cam 37, the vertical adjustment of the knife carrier 23 (in the y-direction) can be achieved. By means of a second control roller 38, which is guided within a control cam 39, the knife carrier 23 is configured and adapted to be movable horizontally inside the abdominal cavity 25 between the tensioned abdominal skin 18 and the viscera 40 starting from the vent opening 13 in the direction towards the tip 21 of the sternum 22 and back. To that end, the control roller 38 is arranged on the adjusting arm 33 at the end opposite the articulated joint 35. As a result of the profile of the control cam 39 and the guiding of the control roller 38 in the control cam 39, the horizontal adjustment of the knife carrier 23 (in the x-direction within the plane spanned by the x- and y-axes) can be achieved.

Figure 5:
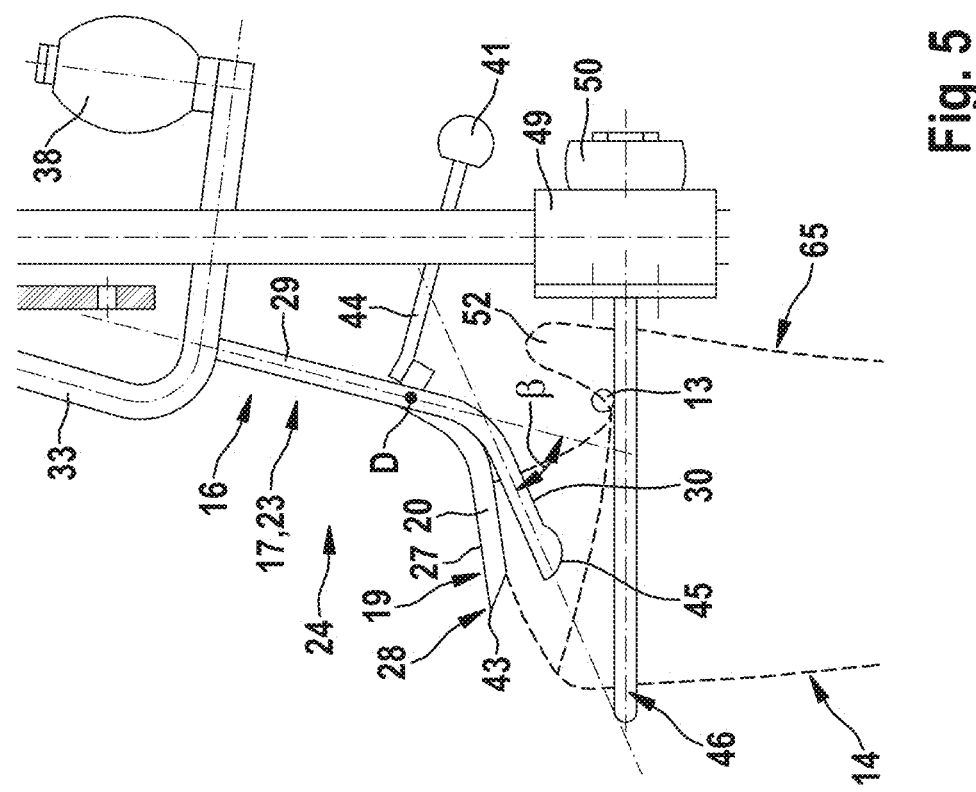
FIG. 5 is an enlarged view of the unit according to FIG. 2.

In addition to the degrees of freedom of the knife carrier 23 with the separating knife 20, the separating knife 20 is configured to be movable by means of a control roller 41, which is guided within a control cam 42, relative to the knife carrier 23 from the standby position, in which the separating knife 20 is located completely inside the slot 31 (see in particular FIGS. 1 and 4), into the cutting position, in which the separating knife 20 is situated outside the slot at least with a free tip 43 of the free end 28 of the separating knife 20, and back (see in particular FIGS. 2 and 5). To that end there is provided an adjusting arm 44 which on the one hand is connected to the separating knife 20 in the region in which the separating knife 20 is mounted on the knife carrier 23 and which on the other hand has the control roller 41 at an end opposite the separating knife 20.

The connection between the knife carrier 23 and the adjusting arm 33 can be fixed and rigid. Optionally (and not shown), the knife carrier 23 can also be configured to be movable relative to the adjusting arm 33. For example, the longer leg 29 of the knife carrier 23 can be arranged on the adjusting arm 33 in such a manner that it is rotatable about its longitudinal axis. The knife carrier 23 with the separating knife 20 is thus adjustable in an additional degree of freedom, such that the knife carrier 23 with the separating knife 20 is movable in a horizontal plane (inter alia in FIG. 1 and in FIG. 6 in the plane spanned by the x- and z-axes). In other words, the additional degree of freedom allows the knife carrier 23 with the separating knife 20 to be movable to and from sideways inside the abdominal cavity 25, for example in order to oscillate to and from inside the abdominal cavity 25 between points A, B and C.

The knife carrier 23 can have different designs and forms. Preferably and shown in the drawing, the knife carrier 23 is flat, at least in the region of the shorter leg 30, on an upper side facing the inside of the abdominal skin 18. The flat portion, that is to say a flat surface, can extend as far as and into the region of the longer leg 29. On a lower side of the knife carrier 23 facing away from the upper side, the knife carrier is preferably semi-circular in cross-section. At a free end of the shorter leg 30 the knife carrier 23 comprises a probe head 45. The probe head 45 is hemispherical and is adapted to locate the tip 21 of the sternum 22. The height at which the probe head 45 is movable inside the abdominal cavity 25 can be changed by means of the control roller 36, for example, so that the probe head 45 can be positioned either above or beneath the layer of fat located between the abdominal skin 18 and the viscera 40.

During processing of a poultry body 14, the poultry body is positioned and held by means of the supporting apparatus 15. To that end, the supporting apparatus 15 preferably comprises a supporting ring 46, which is movable at least vertically up and down and can be positioned from above over the tail region of the poultry body 14 between the legs 11, and two supporting hooks 47, 48, which are movable at least vertically up and down and rest from beneath in the region of the hips. The supporting ring 46 is arranged on a sliding sleeve 49 which is guided on the or each slide rod 32. On the sliding sleeve 49 there is arranged a control roller 50, which is guided in a control cam 51. The supporting ring 46 is configured to be closed, starting from the sliding sleeve 49, and is configured to rest against the poultry body 14 in an encircling manner preferably just beneath the tail 52 (see in particular FIGS. 4 and 5). The supporting hooks 47, 48 are preferably arranged on a common sliding sleeve 53, which is guided on the or each slide rod 32. On the sliding sleeve 53 there is arranged a control roller 54, which is guided in a control cam 55. The supporting hooks 47, 48 can be arranged directly on the sliding sleeve 53. The supporting hooks 47, 48 are preferably arranged on a supporting flange 56. In the supporting flange 56 there are formed elongate holes 57 in which the supporting hooks 47, 48 are adjustably arranged and removably fastened.

In the region of the supporting apparatus 15, preferably between the supporting hooks 47, 48, there is arranged a supporting plate 58 which is configured and adapted to be movable from a standby position (shown by a broken line in FIGS. 1 and 2) into a supporting position (shown in FIG. 1) and back. By means of the supporting plate 58, a force can be applied to the poultry body 14—preferably just beneath the tail 52—specifically against the resistance of the supporting ring 46, such that the tail 52 can be moved towards the apparatus 10, or more specifically towards the sliding sleeve 49 of the supporting ring 46, in order to free the vent opening 13. The supporting plate 58 arranged in the region of the supporting hooks 47, 48 is movable by means of a control roller 59, which is guided within a control cam 60, from the standby position in the direction towards the poultry body 14 to be processed into the supporting position and back. To that end, there is provided an adjusting arm 61 which is arranged with one end on the supporting plate 58 and at the opposite end of which the control roller 59 is arranged. The supporting plate 58 is mounted in an articulated manner in the region of the supporting flange 56, spaced apart from the sliding sleeve 53, such that the supporting plate 58 is oriented substantially vertically in its supporting position, while in the standby position it is inclined, starting from its bearing point, obliquely in the direction towards the apparatus 10.

As already described, the supporting apparatus 15 and the unit 24 formed of a tensioning device 16 and a separating device 19 are arranged on at least one substantially vertically oriented slide rod 32, specifically preferably by way of their respective sliding sleeves 34, 49, 53. At least one supporting apparatus 15 and at least one unit 24 formed of a tensioning device 16 and a separating device 19 is arranged by way of the or each respective slide rod 32 on a carousel conveyor 62 which can be driven in rotation about a substantially vertically oriented axis of rotation, wherein the stationary but adjustable and/or replaceable control cams 37, 39, 42, 51, 55, 60 for the control rollers 36, 38, 41, 50, 54, 59 are arranged between two carousel plates 63, 64 which are arranged spaced apart from one another and to which the or each slide rod 32 is fastened. The relative movability of the individual components relative to the or each slide rod 32 has already been described. However, the entire assembly consisting of the carousel conveyor 62 including the carousel plates 63, 64 and the control cams 37, 39, 42, 51, 55, 60 and each supporting apparatus 15 as well as each unit 24 formed of a tensioning device 16 and a separating device 19 can optionally also be configured and adapted to be movable vertically up and down by means of a drive (not explicitly shown).

The method according to the invention will be described in greater detail in the following text with reference to the drawing.

For cutting open a slaughtered poultry body 14 which is suspended by the legs 11 and has already been cut free in the region of the cloaca 12 to form a vent opening 13, the poultry body 14 supplied to an apparatus for cutting open is held and positioned by means of a supporting apparatus 15, specifically such that the poultry body 14 is positioned with its head down, its tail 52 up and its back 65 facing the apparatus 10 for cutting open. The abdominal skin 18 of the poultry body 14 is then tensioned by means of a tensioning means 17 of a tensioning device 16 by increasing the distance between the abdominal skin 18 and viscera 40 located in an abdominal cavity 25 of the poultry body 14. As soon as the distance is sufficient, a longitudinal cut is made in the tensioned abdominal skin 18 of the poultry body 14 between the vent opening 13 and a tip 21 of a sternum 22 of the poultry body 14 by means of a separating knife 20 of a separating device 19. Holding and positioning are carried out, for example, in that the poultry body 14 entering the region of the apparatus 10 is supported by the supporting apparatus 15 in that a supporting ring 46 is lowered from above between the legs 11 of the poultry body 14 and over the tail (region) 52, so that the supporting ring 46 on the one hand surrounds the abdomen of the poultry body 14 and on the other hand abuts against the insides of the legs 11. Supporting hooks 47, 48 are moved upwards from beneath to both legs 11 in the hip region, so that the poultry body 14 is fixed and positioned in all directions.

This method is distinguished according to the invention in that the separating knife 20 is inserted together with a knife carrier 23 as the tensioning means 17 jointly as a unit 24 through the existing vent opening 13 into the abdominal cavity 25, wherein, during the insertion movement of the unit 24 into the abdominal cavity 25, the separating knife 20 is located inside the knife carrier 23 in a standby position in which it is completely covered by the knife carrier 23. As soon as the unit 24 is located with its free end 26 beneath the abdominal skin 18, that is to say the unit 24 has entered the abdominal cavity 25 through the vent opening 13, the abdominal skin 18 is tensioned by means of the unit 24 in that the unit 24 with the completely covered separating knife 20 is moved upwards in order to increase the distance of the abdominal skin 18 from the viscera 40. When the abdominal skin 18 is sufficiently tensioned, the longitudinal cut is made from the inside in the tensioned abdominal skin 18 in order to cut open the poultry body 14 between the vent opening 13 and the tip 21 of the sternum 22 in that the separating knife 20 is moved from the standby position into a cutting position, in which the separating knife 20 protrudes at least partly from the knife carrier 23. After cutting, the unit 24 is moved back into its starting position so that it is ready for use for the next poultry body 14.

For cutting open the poultry body 14, the unit 24 is first lowered substantially downwards (in the direction of the y-axis) through the vent opening 13 into the abdominal cavity 25, so that the unit 24 is located beneath the abdominal skin 18 and above the viscera 40. The position of the unit 24 and in particular of the free end 26 of the unit 24 can be controlled precisely, for example to a height in which the free end 26 is positioned beneath the abdominal skin 18 and above a layer of fat which separates the abdominal skin 18 from the viscera 40, or to a height in which the free end 26 of the unit 24 is positioned between the layer of fat and the viscera 40. When the final height of the unit 24 inside the abdominal cavity 25 is reached-optionally also shortly therebefore or shortly thereafter—the unit 24 is then moved substantially horizontally (in the direction of the x-axis) from the vent opening 13 in the direction towards the tip 21 of the sternum 22 until the free end 26 of the unit 24 has reached the tip 21 of the sternum 22. The flat upper side of the unit 24 thereby slides along and scrapes the inside of the abdominal skin 18, or the layer of fat, while the curved and rounded lower side displaces either the layer of fat and/or the viscera 40. On reaching the tip 21 of the sternum 22—optionally also shortly therebefore, that is to say superimposed on the horizontal movement—the unit 24 can be moved upwards in order to tension the abdominal skin 18 further. However, the cut can also be completely finished before the unit 24 is moved upwards again. An example of a movement profile $B_V$ of the free end 26 of the unit 24 is shown by a broken line in FIGS. 1 and 2.

On reaching the tip 21 of the sternum 22—optionally also slightly later—the separating knife 20 is moved from the standby position into the cutting position, whereby the separating knife 20 pierces the abdominal skin 18 in the region of the tip 21 of the sternum 22 with its tip 43 and then with its cutting edge 27 and cuts the abdominal skin 18 starting from the tip 21 of the sternum 22 in the direction towards the vent opening 13. As a result of the pivoting movement of the separating knife 20 about the axis of rotation D, the separating knife 20 moves increasingly further out of the knife holder 23 upwards, whereby—optionally paired with the upward movement of the unit 24 as a whole—a longitudinal cut directed from the inside of the abdominal cavity 25 away from the viscera 40 separates the connection of the abdominal skin 18 starting from the tip 21 of the sternum 22 to the vent opening 13. The supporting apparatus 15 thereby holds the poultry body 14 in position.

Although the unit 24 enters the abdominal cavity 25 perpendicularly from the movement direction, the angular form of the knife carrier 23 ensures that the unit 24 enters the vent opening 13 with its free end 26 at an angle β of between 5° to 45° with respect to the vertical. The size of the angle is variable in that the movements linearly up and down along the or each slide rod 32 (in the x-direction) and pivoted about the axis of rotation (in the y-direction) are adapted and matched to one another.

In addition to the movement of the unit 24 in the y-direction and in the x-direction, a movement in the z-direction can also be provided. The unit 24 is preferably additionally moved to and from inside the abdominal cavity 25 sideways, namely transverse to an imaginary connecting line between the vent opening 13 and the tip 21 of the sternum 22. The sideways movement in the plane spanned by the x- and y-axes serves to scrape (free) the connections between the abdominal skin and the layer of fat and/or between the layer of fat and the viscera 40. In other words, the unit 24 is configured and adapted, depending on the position of the unit 24 inside the abdominal cavity 25, to leave the layer of fat either on the poultry body 14 in the region of the abdominal skin 18 or on the viscera 40 and in particular the stomach. The possible sideways movements of the free end 26 of the unit 24 can be seen in particular in FIG. 6. The unit 24 can be moved, for example, starting from the vent opening 13, first linearly in the x-direction as far as point A, in order then to be pivoted to the right to point C. From point C, the free end 26 can then be moved to the tip 21. Starting from point A, the free end 26 can also be pivoted to the left to point B, in order to be moved from point B to the tip 21. Other movements of the free end 26 inside the abdominal cavity 25 can of course be achieved by the at least three degrees of freedom.

A preferred further development provides that, before the unit 24 is inserted into the vent opening 13, the poultry body 14 is pushed by means of a supporting plate 58 in the horizontal direction away from the apparatus 10 and against a supporting ring 46 of the supporting apparatus 15 in order to move the tail 52 of the poultry body 14 out of the region of the vent opening 13. To that end, the supporting plate 58 is pushed beneath the tail 52 against the back 65 of the poultry body 14, whereby the tail 52 is pushed into its natural starting position so that the vent opening 13 is freely accessible.

One possibility for the longitudinal cut between the tip 21 of the sternum 22 and the vent opening 13 consists in making a linear cut, that is to say along cutting line $L_S$ according to FIG. 6. Another possibility consists in a curved cutting line $G_S$ according to FIG. 6. The curved cutting line $G_S$ can be achieved by the (sideways) movement of the unit 24 with the separating knife 20 also in the z-direction. A curved, sickle-shaped separating knife 20 with which the cutting line $G_S$ is produced can optionally also be used. The curved cut serves in particular to cut around the region of the stomach, in the region of which the majority of the layer of fat is located, so that, on cutting, the layer of fat remains on the stomach, whereby the removal of the viscera package is facilitated.

The apparatus 10 is in principle set up for the processing of one size, or of one size range, of the poultry bodies 14. However, the apparatus 10 as a whole can be adjusted in terms of height in order to be able to process poultry bodies 14 of different sizes or different size ranges. The method is very particularly preferably carried out by means of an apparatus 10 as described herein.

The invention claimed is:

1. An apparatus, configured and adapted for cutting open a slaughtered poultry body which is suspended by legs and has already been cut free in a region of a cloaca to form a vent opening, the apparatus comprising:

a supporting apparatus for holding and positioning the poultry body during cutting;

a tensioning device having a tensioning means for tensioning abdominal skin of the poultry body; and a separating device having at least one separating knife which is configured and adapted to make a longitudinal cut in the tensioned abdominal skin of the poultry body between the vent opening and a tip of a sternum of the poultry body;

wherein;

the tensioning means comprises a knife carrier on which the at least one separating knife is pivotably mounted to form a unit with the knife carrier;

the at least one separating knife is configured and adapted to be movable relative to the knife carrier from a standby position, in which the separating knife is arranged in a completely covered manner inside the knife carrier, into a cutting position, in which the separating knife protrudes at least partly from the knife carrier, and back.

2. The apparatus according to claim 1, wherein the unit configured and adapted for tensioning and cutting the abdominal skin is configured and adapted for insertion through the vent opening into an abdominal cavity, and the at least one separating knife is in the standby position on insertion of the unit into the abdominal cavity and on tensioning of the abdominal skin by the knife carrier, and the separating knife is moved into the cutting position when a final tensioning position of the knife carrier is reached.

3. The apparatus according to claim 1, wherein the unit, and in particular the at least one separating knife, is configured and adapted to make the longitudinal cut from an inside of the abdominal skin starting from the tip of the sternum to the vent opening.

4. The apparatus according to claim 1, wherein the knife carrier is substantially L-shaped with a longer leg and a shorter leg, and there is formed at least in the shorter leg a slot in which the at least one separating knife is positioned.

5. The apparatus according to claim 4, wherein the two legs are oriented relative to one another at an angle β of between 5° and 45° with respect to vertical.

6. The apparatus according to claim 4, wherein the slot extends, starting from a free end of the short leg, in a longitudinal direction into a region of the long leg, and the at least one separating knife is rotatably mounted inside the slot in a region of the long leg.

7. The apparatus according to claim 4, wherein the longer leg of the knife carrier is arranged with an end opposite the shorter leg on an adjusting arm, which is mounted on a sliding sleeve.

8. The apparatus according to claim 7, wherein the longer leg is arranged on the adjusting arm in such a manner that the longer leg is rotatable about a longitudinal axis of the longer leg.

9. The apparatus according to claim 4, wherein the at least one separating knife is configured to be movable by a control roller, which is guided within a control cam, relative to the knife carrier from the standby position, in which the at least one separating knife is located completely inside the slot, into the cutting position, in which the at least one separating knife is situated outside the slot at least with a free tip of the free end of the at least one separating knife, and back.

10. The apparatus according to claim 4, wherein the knife carrier, at least in a region of the shorter leg, is flat on an upper side facing an inside of the abdominal skin.

11. The apparatus according to claim 4, wherein the knife carrier is configured and adapted to be movable vertically up and down by a first control roller, which is guided within a control cam, in order to enter the vent opening and emerge again from the abdominal cavity, and to be movable by a second control roller, which is guided within a control cam, horizontally inside the abdominal cavity between the tensioned abdominal skin and viscera, starting from the vent opening in a direction towards the tip of the sternum, and back.

12. The apparatus according to claim 11, wherein the knife carrier comprises a probe head at a free end of the shorter leg and is controlled vertically such that the probe head is positioned either above or beneath a layer of fat located between the abdominal skin and the viscera.

13. The apparatus according to claim 1, wherein the knife carrier is semi-circular in cross-section on a lower side facing away from an upper side.

14. The apparatus according to claim 1, wherein the supporting apparatus comprises:

a supporting ring which is movable at least vertically up and down and can be positioned from above over a tail region of the poultry body between the legs; and two supporting hooks which are movable at least vertically up and down and rest from beneath in a region of hips.

15. The apparatus according to claim 14, wherein the supporting ring and the or each supporting hook are each configured and adapted to be movable by a control roller which is guided within a control cam.

16. The apparatus according to claim 14, wherein a supporting plate is arranged in a region of the supporting apparatus and is configured and adapted to be movable from a standby position into a supporting position and back.

17. The apparatus according to claim 16, wherein the supporting plate is arranged in a region of the supporting hooks and is movable by a control roller which is guided within a control cam from the standby position in a direction towards the poultry body to be processed into the supporting position and back.

18. The apparatus according to claim 1, wherein the supporting apparatus and the unit, formed of a tensioning device and a separating device, are arranged on a substantially vertically oriented slide rod.

19. The apparatus according to claim 18, wherein:

the supporting apparatus comprises at least one supporting apparatus;

the unit comprises at least one unit each formed of a tensioning device and a separating device;

the at least one supporting apparatus and the at least one unit are each arranged by way of the respective slide rod on a carousel conveyor which is driven in rotation about a substantially vertically oriented axis of rotation;

stationary control cams for control rollers are arranged between two carousel plates which are arranged spaced apart from one another; and the or each slide rod is fastened to the two carousel plates.

20. The apparatus according to claim 19, wherein the entire assembly consisting of the carousel conveyor and each supporting apparatus as well as each unit (24) formed of a tensioning device and a separating device is configured and adapted to be movable vertically up and down.

21. A method for cutting open a slaughtered poultry body which is suspended by legs and has already been cut free in a region of a cloaca to form a vent opening, comprising the steps:

holding and positioning a poultry body, which has been supplied to an apparatus for cutting open the poultry body, by a supporting apparatus;

tensioning abdominal skin of the poultry body by a tensioning means of a tensioning device by increasing a distance between the abdominal skin and viscera located in an abdominal cavity of the poultry body; and making a longitudinal cut in the tensioned abdominal skin of the poultry body between the vent opening and a tip of a sternum of the poultry body by a separating knife of a separating device;

wherein;

the separating knife together with a knife carrier as the tensioning means are inserted jointly as a unit through the existing vent opening into the abdominal cavity, wherein the separating knife, during the insertion movement of the unit into the abdominal cavity, is located inside the knife carrier in a standby position in which it is completely covered by the knife carrier;

the abdominal skin is tensioned by the unit in that the unit with the completely covered separating knife is moved upwards in order to increase a distance of the abdominal skin from the viscera; and the longitudinal cut is then made from the inside in the tensioned abdominal skin in order to cut open the poultry body between the vent opening and the tip of the sternum in that the separating knife is moved from the standby position into a cutting position, in which the separating knife protrudes at least partly from the knife carrier.

22. The method according to claim 21, wherein:

the unit is first lowered substantially vertically downwards through the vent opening into the abdominal cavity, so that the unit is located beneath the abdominal skin and above the viscera;

the unit is then moved substantially horizontally from the vent opening in a direction towards the tip of the sternum until a free end of the unit has reached the tip of the sternum.

23. The method according to claim 22, wherein, upon reaching the tip of the sternum, the separating knife is moved from the standby position into the cutting position, whereby the separating knife pierces the abdominal skin in a region of the tip of the sternum and cuts open the abdominal skin starting from the tip of the sternum in a direction towards the vent opening.

24. The method according to claim 21, wherein the unit enters the vent opening with a free end of the unit at an angle of between 5° to 45° with respect to the vertical.

25. The method according to claim 21, wherein the unit is moved upwards while the abdominal skin is being cut.

26. The method according to claim 21, wherein the unit is additionally moved to and from sideways inside the abdominal cavity, namely transverse to an imaginary connecting line between the vent opening and the tip of the sternum.

27. The method according to claim 21, wherein the unit is lowered with a free end of the unit either between the abdominal skin and a layer of fat or between the layer of fat and the viscera.

28. The method according to claim 21, wherein, before the unit is inserted into the vent opening, the poultry body is pushed by a supporting plate in a horizontal direction away from the apparatus and against a supporting ring of the supporting apparatus in order to move a tail of the poultry body out of a region of the vent opening.

29. The method according to claim 21, wherein the apparatus as a whole is adjusted in terms of height in order to process poultry bodies of different sizes.

30. The method according to claim 21, wherein the method it is carried out by n apparatus comprising:

a supporting apparatus for holding and positioning the poultry body during cutting;

a tensioning device having a tensioning means for tensioning abdominal skin of the poultry body; and a separating device having at least one separating knife which is configured and adapted to make a longitudinal cut in the tensioned abdominal skin of the poultry body between the vent opening and a tip of a sternum of the poultry body;

wherein;

the tensioning means comprises a knife carrier on which the at least one separating knife is pivotably mounted to form a unit with the knife carrier;

the at least one separating knife is configured and adapted to be movable relative to the knife carrier from a standby position, in which the separating knife is arranged in a completely covered manner inside the knife carrier, into a cutting position, in which the separating knife protrudes at least partly from the knife carrier, and back.

* * * * *